United States Patent [19]

Schmid

[11] Patent Number: 4,783,511

[45] Date of Patent: Nov. 8, 1988

[54] PROCESS FOR PREPARING MOULDED BODIES FROM MODIFIED THERMOPLASTIC POLYAMIDES

[75] Inventor: Eduard Schmid, Bonaduz, Switzerland

[73] Assignee: Ems-Inventa AG, Domat, Switzerland

[21] Appl. No.: 62,350

[22] Filed: Jun. 11, 1987

Related U.S. Application Data

[63] Continuation of Ser. No. 841,934, Mar. 20, 1986, abandoned.

[51] Int. Cl.[4] .............................................. C08L 77/00
[52] U.S. Cl. ..................... 525/431; 525/101; 525/105; 525/106; 525/178; 525/181; 525/183; 525/184; 264/41; 264/328.17; 264/331.16; 264/331.19; 264/331.11
[58] Field of Search ............... 264/328.17, 41, 331.16, 264/331.19, 331.11; 525/431, 101, 105, 106, 178, 181, 183, 184

[56] References Cited

U.S. PATENT DOCUMENTS

| | | | |
|---|---|---|---|
| 3,637,550 | 1/1972 | Sprauer | 525/431 |
| 4,319,007 | 3/1982 | Khattab | 525/431 |
| 4,647,630 | 3/1987 | Schmid et al. | 525/431 |

FOREIGN PATENT DOCUMENTS 2131037  6/1984  United Kingdom ............... 525/431

Primary Examiner—Melvyn I. Marquis
Attorney, Agent, or Firm—Bierman and Muserlian

[57] ABSTRACT

A process for the preparation of moulded bodies of thermoplastic polyamides, which comprises intensively mixing a polyamide and a masterbatch, converting the mixture by conventional thermoplast processing to moulded bodies and, before use, conditioning the bodies by contact with ambient moisture or, briefly, with water, in which the masterbatch contains at least 5% by weight of a silane substituted by one, 2 or 3 hydrolysable radicals and a functional group which can undergo a chemical reaction, to form a bond, with amino groups and/or carboxyl groups and/or amide groups in the polyamide chain.

16 Claims, No Drawings

PROCESS FOR PREPARING MOULDED BODIES FROM MODIFIED THERMOPLASTIC POLYAMIDES

This application is a continuation, of application Ser. No. 841,934, filed 3/20/86, now abandoned.

This invention relates to a process for preparing moulded bodies from modified thermoplastic polyamides.

Polyamides have been widely used as construction materials. Various primary classes of polyamides are now recognised, each having a valuable range of properties.

Polyamide 6 and 6.6 are the standard polyamide construction materials, being products with a relatively high softening temperature but also a relatively high equilibrium water content. Polyamides 11 and 12 have a lower melting point, but also a distinctly lower equilibrium water content and thus better mould stability. Polyamides 6.9, 6.10, 6.12 and 6.13 exhibit intermediate properties.

Later, there followed the pure amorphous polyamides, e.g. derived from trimethylhexanediamine and terephthalic acid, then polyamides with a crystalline melting point but also a high glass transition point, such as the polyamide derived from m-xylylenediamine and adipic acid. In addition, there are many types of mixed polyamides or copolyamides which are preferably prepared from linear monomers, and which have found many uses, e.g. as textile adhesives or montage adhesives.

In spite of these various uses which are available by virtue of the variety of types of polyamides, there are always uses for which the presently-available polyamide formulations are not satisfactory. For example, the stiffness and tensile strength of an impact-resistant polyamide modified with a foreign polymer are reduced. On heating above the melting point of, a cable isolation or a cover, for example, melts quickly away. On prolonged frictional contact with a rough surface, the PA gives a considerable amount of dust.

DE-A-No. 3339981 describes, in general terms, a process in which there is chemical addition of a silane to a polyamide chain, and in which the silane structure leads to the formation of points of linkage of the polymer chains, on the action of moisture. Depending on the structure of the polyamide as well as the type and concentration of the silane, the result is, advantageously, chain lengthening or the formation of cross-linking points. It follows that properties such as strength, form-retention on heating and resistance to dusting are greatly improved.

It is true that this general process gives moulded bodies with greatly improved properties. However, there is no economical method for their production on a commercial scale.

According to Examples known from this publication, a polyamide granulate is first coated with a silane layer, so that it completely loses its capability of being dosed. The product can also be produced by introducing polyamide powder in a large amount, which forms a layer, by bonding, on the surface of the granulate.

The polyamide is tough, and milling it to give the necessary powder is expensive and successful only at low temperatures, e.g. by using liquid nitrogen. It must then be treated to remove dust, and be completely dried. Because pulverulent polyamide has a very great surface area, there is uptake of moisture even after a short exposure to the ambient atmosphere, immediately giving the problem that the silane may cross-link in the melt apparatus.

Even a different powder, such as a pulverulent processing additive, which in principle can be used to recover sprayability, itself provides essentially the same problems, i.e. the danger of moisture take-up and the introduction of undesirable materials into the reactive mixture.

Further, the amount of the silane which adheres to the surface of the granulate and can be homogeneously distributed is limited. In conclusion, therefore, this two-step pre-treatment process is time-consuming, uneconomic and invariably associated with the danger of moisture take-up.

Spraying the silane into the polyamide melt gives satisfactory results in extrusion, but is not satisfactory for injection moulding. Further, there is the disadvantage, in working during extrusion, that uneconomic technical apparatus is necessary. The silane must be sprayed uniformly, against back pressure from the melt. High demands are placed on the uniformity of mixing between the spraying-in point and the tool, in order that possible variations in concentration are equalised and that the silane is distributed sufficiently homogeneously.

It is therefore clear that a simple method for the addition of silane in spraying and extrusion processes would present a considerable technical step towards the successful operation of the process. It has now been shown that the process of modifying polyamides by using silanes can be solved in an almost ideal manner, by the use of suitable masterbatches.

According to the present invention, a process for the preparation of moulded bodies of thermoplastic polyamides which have improved mechanical properties and higher shape-stability in the warm than the polyamide starting material, comprises adding to the dry polyamide, before processing, a masterbatch containing at least 5% by weight of a silane of formula I

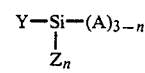

wherein n is 0, 1 or 2;
    A is a hydrolysable radical, the A's being the same or different, or two A's forming a divalent radical, when n is 0 or 1;
    Z (if present) is an inert organic radical, the Z's being the same or different when n is 2; and
    Y is an organic radical substituted by a functional group which can undergo a chemical reaction with amino groups and/or carboxyl groups and/or amide groups in the polyamide chain, melting the mixture of polyamide and masterbatch, homogenising (mixing) the melt intensively and then transforming it by conventional processes in thermoplast treatment, to give moulded bodies, and conditioning these bodies before use by exposure to naturally-ambient moisture or, briefly, water.

For practical, simple operation of the process according to the invention, high requirements are put on the masterbatch substrate. In particular, it should possess good capability for silane uptake, have sufficient compatibility with polyamide in the concentration used and be distributed in the polyamide substantially without detrimental effect on the properties of the polyamide, not destabilise the added silane with respect to its hydrolysability, and generally possess water-repellent properties, so that there is no problem associated with the uptake of moisture.

When reference is made to silanes, below, it is to silanes which are reactive with polyamides, but in particular to two types of silane, i.e. epoxy silanes of the formula II and isocyanosilanes of the formula III. Other silanes, of formulae IV to VII, are given below, and they are described generally in GB-A-No. 2131037.

Extensive tests have shown that various methods are available for the preparation of a suitable masterbatch. Three methods may be summarised as follows:

(1) The melt of a polyolefin is loaded directly with the silane and the silane-containing melt is drawn off as a cord which is comminuted to give a granulate which is carefully dried.

(2) A silane-swellable carrier material is used; this is, for example, in the form of crumbs, grains or a coarse powder which is brought directly into contact with the silane, so that the silane is directly taken up. The carrier must of course remain sprayable, i.e. there should be no adhesion.

(3) A thermoplast which is in the form of a sponge, with open pores, but which has no swellability with respect to the silane, is mixed with the maximum amount of silane sufficient to fill the pores. The sprayability of the product should be essentially unchanged.

Method 1 is generally used when the thermoplast does not itself take up the silane. Examples of thermoplasts which are suitable for this process are the so-called LLDPE, i.e. linear low density polyethylene, ethylene-propylene copolymers (EP-rubber), elastomers known as EPDM, copolyolefins with low glass transition points, which can be terminated with low amounts of, e.g. maleic anhydride, or mixtures of these polymers. Flowable products are suitable, e.g. those with a so-called melt index (according to ISO R 292) of 5 or more.

In order to conduct the process practically, the products are melted, e.g. in a double-wave mill and perhaps in a so-called two-plate mill, e.g. that available as ZSK-30 from Werner and Pfleiderer, Stuttgart, Germany. Using degasification, the silane can be introduced continuously, in a predetermined proportion, into the polymer melt. The maximum silane uptake of the melt should be determined in a preliminary test. In order to regulate continuous dosing of the silane, electronic means are suitable, e.g. 6- or 8-unit peristaltic pumps, so that the silane is applied without pressure on to the upper surface of the polymer melt and subsequently mixed in and dissolved.

The extruded cord can be cooled in a water bath, to the extent that it can be continuously comminuted to give a granulate. The contact time with the water should be limited so that only the necessary cooling function is achieved, and condensed after leaving the cooling trough and before the comminution apparatus. Transport from the extruder to the granulator can also be conducted on a cooling conveyor, e.g. a water-cooled steel band.

Method 2 is suitable if the thermoplast spontaneously takes up silane. The method is extraordinarily simple, and is very suitable for practical operation of the process. It represents a considerable technical simplification, that thermoplasts have been found which spontaneously, and in a short time, take up considerable amounts of silane, without adhesion, which can easily be worked into polyamide in the silane-bearing form, whereby the silane is released so that it can react with the polyamide and therefore scarcely influence the workability and the mechanical properties of the polyamide.

Polymers which can be used in method 2 are block polymers with a hard block and elastomer segment. The hard block may comprise, e.g. polystyrene, the elastomer segment being derived from, for example, polybutadiene, polyisoprene or a saturated, i.e. double bond-free block, e.g. of an ethylene-butene or ethylene-propylene copolymer. The elastomer block may also comprise a mixture of different block structures.

The ratio of hard block to elastomer block can vary within a wide range. However, tri-block polymers having an elastomer block content of at 50%, more particularly 60–75%, are preferably used, because the elastomer block is responsible for the silane uptake. A styrene-ethylene-butene block polymerisate having 70% by weight of ethylene-butene content takes up more than its own weight of silane, without agglomeration.

These block polymers can be introduced in the form of crumbs, granulates, grains or powder. Grains having an average cross-section of about 0.1–0.2 mm are very suitable. They do not give rise to dust, take up the silane within a short time, and adhere well to the surface of the polyamide granulate, so that within a few minutes after mixing, a homogeneous mixture between such a masterbatch and polyamide is obtained.

In general, this type of masterbatch carrier is loaded with more than, for example, 20% by weight silane. Particularly satisfactory masterbatches are those which contain about 50% by weight silane. If the polyamide is worked together with such a masterbatch, the final product contains only very little foreign polymerisate, and the inherent properties of the polyamide are largely retained.

The general process according to method 2 is very simple. With gentle mixing of the masterbatch particles, e.g. grains of poly(styrene-ethylene-butene-styrene)triblock polymerisate, silane is added and the mixture is then homogenised by shaking for a short time. After allowing it to stand for a short time, e.g. 10 minutes, the silane is taken up. A predetermined amount of masterbatch, e.g. 2–3% by weight, is then added to the dry PA granulate and mixed for a time sufficient that the masterbatch is homogeneously distributed throughout the granulate. This in the case after a few minutes. The grains thus adhere well to the granulate surfaces. The mixture can now be stored or used directly. The only criterion is the exclusion of moisture.

Method 3 has as its object the use of open-pored "polymer sponges" which spontaneously absorb liquids by capillary action. Polymer systems of this type are described, e.g. in Kunststoffe 71 (3) 183–184, and in DE-C-No. 2737745.

Polymers having such a microporous structure are prepared, for example, from various polyethylene types, from polypropylene, from polycarbonates and also from polyamides such as polyamides 11, 12, 6 and 6.6. The pore volume is from 50–85% and the cross-section of the pores is in the range of 0.1–10 $\mu$u. These microporous polymers can take up to about three times their weight of silane. The absorption of any residual moisture is therefore comparatively low.

Particularly suitable masterbatch carriers for the processing of polyamides are grains of medium and low viscosity microporous nylon-11 and nylon-12. These types have the lowest moisture uptake of linear polyamides, melt well in processing, and are easily soluble in all polyamides, in concentrations desired for use, so that the end product has in practically all cases a uniform polyamide phase.

In general, method 3 provides a particularly satisfactory way of operating the process. The single disadvantage is the somewhat expensive process for preparing microporous polymer systems.

Microporous polypropylene and polyamide 12 spontaneously take up about three times their own weight of silane. The principal use of these masterbatch types is in accordance with method 2.

For processing in accordance with the process of the invention, any thermoplastically-workable polyamide can be used. In so far as that presents any advantage, it may be desirable to use polyamides with clearly-defined and known reactive groups. Amino groups are preferred in this context.

If a largely linear chain-lengthening, with as few as possible cross-linked points, is desired, polymer chains with terminal —NH—R groups are preferred. This type of chain end can only react with one silane, so that in conditioning there are preferably linkage points at the end of two polyamide chains.

If it is desired to form a three-dimensional network, polyamide chains with —NH$_2$ terminal groups as well as, depending on the desired degree of cross-linking, additional —NH— groups in the chain, are used. The concentration of the —NH$_2$ and —NH— groups, expressed for example as µeq/g (—NH—+—NH$_2$) in the polyamide melt, is a direct measure of the potential density of cross-linking, if and amine-reactive silane is used. If the polyamide chains have a structure such that the amine functionalities are solely at the chain ends in the form of —NH$_2$ groups, a desired higher density of cross-linking can be reached, as for medium and high viscosity polyamides, if a short-chain polyamide is used.

The cross-linking herein is essentially of the type in which the —NH$_2$ group reacts almost stoichiometrically with two epoxide or isocyanate groups, so that, using a silane of formula I, there is first obtained the following structure:

polyamide
 chain—N[CH$_2$—CHOH—CH$_2$—O—(CH$_2$)$_3$—Si(OCH$_3$)$_3$]$_2$

Formula VIII, wherein R represents the linking group —O—(CH$_2$)$_3$— and PA represents a polyamide chain, shows a range of linkages of polyamide chains, in which various types of chain links and branches are schematically represented. (A) shows chain branching which is obtained by the addition of two silane molecules to one —NH$_2$ group. (B) shows the case (occasional) in which chain branching is at silicon. Chain branching according to A is much preferred to that according to B. (C) shows the case in which only one silane has been available for reaction with the —NH$_2$ group. (D) is the structure which results when a secondary amino group is at the chain end.

Since the nature and concentration of the amino groups in the polyamide are given by the formulation for polymerisation (nature and concentration of the chain regulator) and can also easily be controlled analytically, the desired silane concentration, for amine-reactive silanes, can easily reckoned. Desired chemical modification of polyamides, to practical requirements, can therefore be achieved.

Accordingly, the maximum amount of reactive silane for a —NH$_2$—chain-terminated polyamide is e.g. 40 µeq/g (NH$_2$) and the amount of silane of formula I (mw 236.4) per kg polyamide is 40.2.0, 2364.1=18.9 g.

The process is not restricted to pure polyamides, but is also suitable in many cases for polyamide blends or alloys, in which at least one component is a polyamide and the further component(s) are inert with respect to silane, or may also contain silane-reactive sites. Examples of alloy components are the known polyethylene-mixed polymerisates, e.g. of ethylene with butyl acrylate and vinyl acetate, and also to some extent terminated (e.g. with maleic anhydride) olefin-mixed polymerisates. Silane-reactive alloy components are, for example, thermoplastic polyesters, ethylene-acrylic acid mixed polymerisates, hydroxy-terminated polyethers or ethylene-vinyl alcohol mixed polymerisates.

In addition, chemically-cross-linkable polyethylene (PEX) can be processed together with polyamide and masterbatch. In consequence, the polyamide and polyethylene cross-link, on the action of moisture, in separate phases. In addition, there is a chemical reaction at the boundary surface, in which the silane on the polyamide surfaces reacts with the silane on the polyethylene surfaces with the formation of —Si—O—Si— bridges. The resultant polyamide matrix facilitates transport of moisture through the dispersed polyethylene phase.

Since, in general in masterbatching, granulate and masterbatch are mixed before processing, it is usual for all thermoplastic processing of polyamide and thermoplastically-workable polyamide formulations. The criterion is that there should be thorough mixing in the melt, the silane being homogeneously distributed, before the moulding process.

According to the way in which the starting materials are processed, different demands are put on the apparatus, and various moulded bodies, i.e. final products, are available. The delivery apparatus, i.e. the inlet funnel, should be so arranged, for all processing apparatus, that no moisture can be taken up by the polyamide-masterbatch mixture which is present there. This can be achieved by simple means, e.g. a satisfactorily sealing cover and flushing with a dry gas. Gentle heating of the charged material is also an effective safety precaution.

For injection moulding, a screw injection moulding machine with a fully effective three-zone screw is necessary. Under certain conditions, plastification can occur on degasification, so that piston injection moulding machines are unsuitable.

In the melting process, the mixture of polyamide and masterbatch must be intensively homogenised. During the injection, subsequent pressure and cooling periods, melting of the granulate-masterbatch mixture ceases, as usual. If the silane must be sprayed in, the spraying step must be conducted absolutely synchronously with the granulate dissolution step, so that there are no fluctuations, in the degree of cross-linking, in the final product. Solution of this problem would involve considerable technical expense. In the masterbatch process according to the invention, such problems do not arise. In principle, problems of spraying to give hollow bodies are solved at the same time.

On extrusion and in extrusion blowing processes, the granulate is melted continuously. The masterbatch process is suitable in this case as also is the manner of directly spraying the silane into the polymer melt. In both cases, effective mixing apparatus is necessary. For direct spraying, however, a considerable number of technical apparatus and controls are necessary, which are quite unnecessary in the masterbatch concept. The masterbatch process is therefore advantageous for all uses, even in extrusion.

The molecular structure of the polyamide product is greatly influenced by the process according to the invention. Starting from a linear chain structure, a product with increased molecular weight and branched chains, to a fully cross-linked structure, is obtained.

Alteration of the properties regarding mechanical and thermal stability, and thus the potential for use, are linked only to a small extent. Parts of polyamide modified according to the invention are thus used where better mechanical properties, higher strength and improved resistance to dusting as well as mould stability above the polyamide melting point are necessary.

Interesting uses arise out of the appearance of the so-called memory effect; sprayed and cross-linked parts can have their form altered by heating above their melting point, and the new shape can be fixed by cooling below the melting point. After reheating above the melting point, the product reverts to its original shape. In consequence, tightly-fitting tubes or cable linkages, for example, can be prepared, by shrinking a product of the invention on to the tube/cable linkage point.

The following Examples illustrate the invention. The three methods of preparation of the masterbatch are first described. The respectively related Tables 1, 2 and 3 summarise these masterbatches. The polymerisates used to practice the process according to the invention are set out in Table 4. The preparation of the test bodies necessary to examine the process are then set out. The test results are given in Tables 5 to 13.

Method 1

In this method, a masterbatch is prepared while introducing the silane into a thermoplast melt.

A double-wave mill (ZSK 30) is charged with the masterbatch-carrier granulate through an oscillating channel. In the region where there is a homogeneous melt, silane is introduced through an open degasification connection in a continuous liquid stream on to the melt and dissolved by the stirred melt. The masterbatch-melt is drawn off as a cord and cooled for a short time in a water bath. The still warm cord, which no longer has any surface water, is then granulated and stored in a well-closed container.

Method 2

In this method, a masterbatch is prepared by the direct uptake of silane by the thermoplast. Direct uptake means that the thermoplast, on contact with the fluid silane, spontaneously takes it up.

In this method of masterbatching, the silane is distributed, in as fine a form as possible, over the surface of the carrier. This can be achieved, for example, by spraying and subsequent mixing of the silane. The initially damp, adhesive mixture is then, after complete absorption, again satisfactorily sprayable.

By way of illustration, a finely-powdered grain coating polymer of the MBS type containing about 58% by weight polybutadiene takes up 50% of a silane of formula I, based on the weight of the polymer, such a polymer containing about 46% by weight polybutadiene takes up 33%, a finely-powdered grain coating polymer of the ABS type containing 42% by weight polybutadiene takes up 33% of the silane, and a finely-powdered grain coating polymer of the pure acrylate type takes up 50% of the silane.

Method 3

In this method, the masterbatch is prepared by the take-up of silane by an open-pored polymer sponge. For example, the following procedure may be followed: the silane is uniformly sprayed on to the granular, sprayable porous polymerisate with continuous stirring; the silane is absorbed within a short contact time and the polymer is already then sprayable.

The polymers used for the tests have a free pore volume of 50–85% and a pore cross-section of 0.1–10 μm and are usually capable of taking up 50–75% by weight silane, calculated on the total weight of the product, within a short time. In order to evaluate the process of the invention, masterbatches as shown in Tables 1, 2 and 3 were mixed with various polyamides, in the absence of moisture, and examined in the form of test bodies or tubes.

TABLE 1

| Test | Carrier | Silane II (%) | Stirring (rpm) | Moment (Nm) | Pressure (bar) | Melt temp. (C.) |
|---|---|---|---|---|---|---|
| 1 | LLDPE | 5 | 150 | 29 | 11 | 156 |
| 2 | LLDPE | 9 | 150 | 27.5 | 10 | 153 |
| 3 | LLDPE | 10 | 150 | 25 | 6 | 168 |
| 4 | LLDPE | 7.5 | 150 | 33.5 | 18 | 149 |
| 5 | LLDPE | 10 | 150 | 30 | 14 | 169 |
| 6 | LLDPE | 12.5 | 150 | 28.5 | 14 | 170 |
| 7 | EEA | 3 | 150 | 32 | 15 | 170 |
| 8 | EEA | 9 | 150 | 30 | 13 | 169 |
| 9 | LLDPE/EP | 10 | 150 | 38 | 10 | 176 |
| 10 | LLDPE/EP | 15 | 150 | 40.5 | 10 | 187 |
| 11 | LLDPE/EP | 15 | 150 | 45.5 | 12 | 208 |

The last four columns indicate the conditions of preparation, i.e. the rate of stirring, the moment of rotation, the material pressure and the melt temperature, respectively. The LLDPE used in tests 1, 2, 3, 9 and 10 was a copolymer of ethylene and octene having a melt index of 25. The LLDPE used in tests 4, 5, 6 and 11, a copolymer of ethylene and octene, and the EEA used in tests 7 and 8, a copolymer of ethylene with 18% ethyl acrylate, each had a melt index of 6. The melt index values were calculated at 190° C. under a load of 2.16 kp according to ISO R 292. The EP used in tests 9, 10 and 11 was an ethylene-propylene copolymer terminated with about 0.3% maleic anhydride. The carrier mixtures used in tests 9, 10 and 11 were each 50:50 w/w.

The product of each of tests 1 to 11 was a silane-loaded copolymer which did not exhibit silane exudation, and was easily sprayable.

TABLE 2

| Test | Carrier | Silane | Silane (%) | Uptake (min) |
|---|---|---|---|---|
| 12 | EVA | II | 10 | 150 |
| 13 | EVA | II | 20 | 240 |
| 14 | EVA | III | 10 | 180 |
| 15 | EVA | III | 20 | 300 |
| 16 | SBS | II | 20 | 90 |
| 17 | SBS | IV | 15 | 30 |
| 18 | SBS | III | 15 | 30 |
| 19 | S/EB/S | II | 50 | 2 |
| 20 | S/EB/S | II | 50 | 10 |
| 21 | S/EB/S | II | 50 | 10 |
| 22 | S/EB/S | III | 50 | 10 |
| 23 | S/EB/S | IV | 50 | 10 |
| 24 | S/EB/S | V | 50 | 10 |
| 25 | S/EB/S | VI | 50 | 10 |
| 26 | S/EB/S | VII | 50 | 10 |

TABLE 2-continued

| Test | Carrier | Silane | Silane (%) | Uptake (min) |
|---|---|---|---|---|
| 27 | S/EB/S | II | 60 | 10 |
| 28 | S/EB/S | II | 65 | 10 |

The EVA was an ethylene-vinyl acetate terpolymer available from DuPont as CXA 1025, in the form of a granulate. The carriers used in tests 16 to 28 were triblock polymers available from Shell (S=styrene, EB-=ethylene-butene). The polymer in tests 16, 17 and 18 had a S content of 28% and was in the form of crumbs having a cross-section of about 2–10 mm. The S content was 28% in the polymer for test 19, 33% for test 20 and 29% for each of tests 21 to 28. In each of tests 19 to 28, the carrier was in the form of crumbly, soft grains, 95% by weight, cross-section 0.2–3 mm.

The masterbatches of tests 12 to 26 were sprayable; for tests 16, 17 and 18, this was so after powdering, e.g. advantageously with 1% microtalc. The masterbatch of test 27 tended to agglomerate; that of test 28 agglomerated.

TABLE 3

| Test | Microporous Carrier | Silane Formula | Silane (%) |
|---|---|---|---|
| 29 | Polypropylene | II | 50 |
| 30 | Polypropylene | II | 75 |
| 31 | Polypropylene | IV | 50 |
| 32 | Polypropylene | V | 50 |
| 33 | Polypropylene | VI | 50 |
| 34 | Polypropylene | III | 50 |
| 35 | Polypropylene | III | 75 |
| 36 | PA-12 | II | 50 |
| 37 | PA-12 | III | 50 |
| 38 | PA-12 | II | 60 |

In each case of tests 29 to 38, silane uptake was complete immediately after spraying and intensive mixing. The masterbatch of each of tests 29 to 34, 36 and 37 was sprayable, with a small tendency to clumping; it thus adhered well to the granulate. The masterbatches of tests 35 and 38 agglomerated.

The polyamides used are summarised in Table 4. Polyamide 12 was prepared in conventional manner, using a pressure phase to open the lactam ring. The preparation of polyamide 6 is again known in the art. Polyamide 6/1 was prepared in a so-called closed VK-tube through chain stabilisation with water, and polyamide 6/2 in a 50 litre autoclave, diaminohexane being added as a chain regulator. The transparent polyamide Grilamid TR55 was prepared according to Example 10 of DE-C-No. 2642244. The preparation of polyamide MXD 6 is described in EP-A-No. 0071000, but it can also be prepared by mixing all the monomers in one step, using a pressure phase. The further process steps, as may be also necessary for the preparation of polyamide 6.9 or 6.12, are known in the art.

TABLE 4

| Polymerisate | PA | $\eta$rel | Amine Content ($\mu$eq/g) | Carboxyl Content ($\mu$eq/g) | Amine Type | $\eta$melt (Pa.s) |
|---|---|---|---|---|---|---|
| 1 | 12 | 1.57 | 120 | 16 | —NH$_2$ | |
| 2 | 12 | 1.69 | 90 | 12 | —NH$_2$ | |
| 3 | 12 | 1.67 | 104 | | —NHR | |
| 4 | 12 | 1.58 | 390 | | —NH— | |
| 5 | 12 | 1.93 | 68 | 14 | —NH$_2$ | |
| 6 | 12 | 1.95 | 256 | 11 | —NH— | |
| 7 | 12 | 1.91 | 166 | 16 | —NH— | |
| 8 | 12 | 2.07 | 109 | 21 | —NH— | |
| 9 | 12 | 2.00 | 100 | 35 | —NHR + —NH— | |
| 10 | 12 | 1.94 | 63 | 31 | —NHR | |
| 11 | 6 | 1.61 | 120 | 20 | | 80 |
| 12 | 6 | 1.84 | 53 | 57 | | 200 |
| 13 | 6 | 1.90 | 50 | 50 | | 300 |
| 14 | TR55 | 1.55 | 70 | 50 | | 1700 |
| 15 | MXDA.6 | 1.60 | 89 | 62 | | 100 |

$\eta$rel is the relative solution viscosity, measured as a 0.5% solution of the polymerisate in m-cresol at 20° C., according to DIN 51562. The amine content is determined analytically, e.g. potentiometrically with perchloric acid in a m-cresol-isopropanol mixture (see Bulletin A68 available from the company Metrohm, Herisau, Switzerland). The carboxyl concentration was determined analytically, e.g. in benzyl alcohol at 100° C., using a solution of KOH in benzyl alcohol and visual estimation of the phenolphthalein change. The amine type arises out of the polymerisation components and the nature of chain length regulation; in particular, diaminohexane was chosen for —NH$_2$, diethylene triamine or dihexamethylenetriamine, each combined with azelaic acid, was chosen for —NH—, and 4-amino-2,2,6,6-tetramethylpiperidine combined with azelaic acid was chosen for —NHR.

Polymerisates 1 to 10 were all of the injection moulding type, and 5 to 10 were also of the extrusion type. Polymerisates 1, 4 and 11 had low viscosity, and polymerisates 2, 3, 12 and 13 had medium viscosity. Polymerisates 11, 12 and 13 were PA 6 injection moulding masses, respectively PA 6/2, PA 6/1 and PA 6/1. Polymerisate 14 was a transparent injection moulding polyamide having a glass transition point of 155° C. The polyamide starting material of polymerisate 15 was derived from 1,3-bis(aminomethyl)benzene and adipic acid.

Test Body Preparation and Evaluation

In order to evaluate the process of the invention, selected polymerisates and selected masterbatches were formed into test bodies. Ine type of test body was small rods in accordance with DIN 53453. These bodies were tested for their notch toughness and also their mould stability above the normal polyamide melt point, as reported in Tables 5 to 12.

A second type of test body was tubes prepared using an extruder of the type SM 30 U available from the company Schwabentan, Berlin, Germany, at mass temperatures of 190°–220° C. These were tested, in particular, for their mould stability in their melt state. The results are given in Table 13.

The small rods (60×6×4 mm) were prepared using an injection moulding machine of the type Neomate N 110 565 from the company Netstal, Niederurnen, Switzerland. The machine is provided with an extruder which effectively homogenises the melt. The melt parameters such as the temperature profile of the melt helix and stirring rate are controlled as is thought best possible for the polyamide being used.

In order to examine the mould stability of the polyamide above its normal melt point, the rods were placed on a metal plate for 15 min. at 230° C. (250° C. for Table 11). The results were evaluated as follows:

— : no mould stability, material flows to a liquid melt

+ — : basic form of the test body remains intact, corners and edges are rounded off + : the form of the test body remains intact, corners and edges are at the most rounded off to a very low extent.

In the same context, two intermediate stages are possible, as follows:

— — + : greatly deformed body, tendency to flow obvious

+ + — : well-retained basic form, edges and corners somewhat rounded off.

Table 5 reports tests based on low and medium viscosity polyamide 12 types. The masterbatches each contained silane of formula II and were added so that the mixtures of tests 40, 41, 43 and 44 each contained 1.2% by weight silane and the mixture of test 42 contained 1.0% silane. The melt temperature was 190°–210° C., the stirring rate 50–55 rpm and the mould temperature 22° C. For the notch impact test, the rods were conditioned.

By comparison with test 39 (comparative; no silane addition), the mould stability and notch toughness results for tests 40 to 44 are clearly much improved.

Table 6 reports results using high viscosity polyamide 12 types; polymerisates 6 and 7 have —NH$_2$ end groups and also —NH— functionalities in the polymer chain. The melt temperature was 190°–210° C., the stirring rate 35 rpm and the mould temperature 20° C. The rods of tests 45 to 49 were conditioned.

Tests 45 and 53 were comparative (no masterbatch addition). In each other case, the mould stability and notch toughness were greatly improved. The asterisk indicates that only a part of the test rod was broken.

Table 7 reports results on small rods prepared from a low viscosity starting material combined with masterbatch 10 or 11. The melt temperature was 190°–210° C., the stirring rate 40 rpm and the mould temperature 20° C. All rods were conditioned for the notch toughness test.

Tests 58 and 65 were comparative. Two asterisks indicate that the starting material is a masterbatch (10) which carries no silane. The mould stability and notch toughness results again show very clearly the influence the chain linking reactions.

Table 8 reports results for small rods prepared from polymerisates based on polyamide 12. All the polymerisates, apart from polymerisate 3, were high viscosity materials. The melt temperature was 190°–220° C., the stirring rate 20–40 rpm and the melt temperature 20° C. The products were conditioned for the notch toughness test. For tests 76 and 77, the polymerisate ratios were 30:70 (1:8) and 50:50 (5:8).

For the given masterbatch concentrations, only test 67 gave unsatisfactory mould stability and a low increase in notch toughness (ub means unbroken, i.e. none of the tested rod was broken). Various tests show that, for a ± result in the mould stability test, very high notch toughness values are found. Tests 72 to 77 show that the addition of more than 7% by weight of masterbatch 9 has no important effect with respect to mould stability and notch toughness. Tests 76 and 77 show that various polyamide 12 types can successfully be used, as granulates in the mixture, in the process according to the invention.

Table 9 gives results for small rods based on the low viscosity polymerisate 1. The masterbatches were added so that the rods for tests 78 to 83 each contained 1% by weight silane (II) and those of tests 84 to 87 each contained 1.5% by weight of this silane. The melt temperature was 190°–210° C., the stirring rate 50–55 rpm and the mould temperature 20° C.

Test 78 was comparative. The results show a definite correlation between the mould stability and the amount of silane which is present. Further, the notch toughness is clearly raised, but also fluctuates depending on the various other influences of the masterbatch components.

Table 10 reports the results for test rods using polymerisate 9 or 10 and small additions of masterbatch 19 or 22. The melt temperature was 195°–215° C., the stirring rate 50 rpm and the mould temperature 20° C.

Tests 88 and 94 (pure polymerisate) and also test 89 (masterbatch without silane) were comparative. The results again show the improved mould stability in the warm, as well as improved notch toughness values.

Table 11 shows results for small rods based on polymerisate 14 (transparent polyamide) as well as polyamide 6 and MXD6. The melt temperature was 250°–260° C. (tests 97 to 104), 200°–220° C. (tests 105 to 108) or 220°–230° C. (tests 109 to 111), the stirring rate was 40 rpm, and the mould temperature was 90° C. (tests 97 to 104) or 20° C. (tests 105 to 111). For the notch toughness test, the rods were conditioned in water at 60° C. for two weeks and then for two days in air (and dried for tests 105 to 111).

Tests 97, 101, 105 and 109 were comparative. The results show that, starting from a given masterbatch, and thus a given silane concentration, a mould stability in the warm is again improved. Further, the notch toughness is increased, and products having little or no notch toughness are improved in this respect by chain linking reactions. The rods of tests of 101 to 104 were completely transparent.

Table 12 reports tests in which a granulate mixture of high or low viscosity polyamide 12 type was worked into small rods with the direct addition of a masterbatch according to the invention, using a so-called HDPEX, type 7121-10 available from Asea Kabel, Stockholm, Sweden. The melt temperature was 180°–200° C., the stirring rate 50 rpm and the mould temperature 40° C. Two notch toughness results are reported, the first column giving values after conditioning in water followed by drying, and the second after conditioning in water and subsequent storage in air over 1 day.

Tests 112, 113, 116 and 117 were comparative. The polyethylene was present in finely-divided form in the rods. On sharp bending immediately after injection, there was delamination, but this was difficult to establish after conditioning in water and subsequent drying. It may be inferred that chemical bonding, in the form of —Si—O—Si— bridges, takes place even at the phase boundary surfaces. The notch toughness is again clearly increased by comparison with the silane-free products.

Table 13 reports tests on tubes 8×1 mm. The —NH₂-terminated polymerisate 5 and the —NH— functionality-containing polymerisate 8 were used.

In Table 13, "turns" indicates the number of revolutions in the extruder helix, the inlet and outlet temperatures are the initial and final (extruder-side) temperatures of the cylinder heating zones, and the take-off refers to the rate of taking off the tube. An open, unheated addition funnel was used for these tests, so that the polyamide could take up some moisture before processing. Accordingly, there was a proportion of —Si—O—Si— bridge building in the melt during the tube preparation.

Smooth tubes were obtained by extrusion from polymerisate 5 (only —NH₂ terminal groups), and these retained their mould stability on heating above the polyamide melt point. Tubes having a rough surface were obtained from polymerisate 8; on warming, they did not give a liquid melt but underwent a clear length contraction (not observed in the products of tests 121 to 124 and 129 to 144). This contraction is related to the so-called memory effect. The many cross-linking points which already exist in the polyamide melt are bonded between nozzle and apparatus, and this cross-linked state is "frozen in" on quick cooling. On re-warming, the non-internally-bound state is regained. This effect exists for polyamides having —NH₂ terminal groups, where there have already been chain lengthening reactions with silane.

Tests 129 and 130 relate to the preparation of tubes from a polymerisate similar to polymerisate 5, but with a somewhat shorter chain length (93 meq/kg —NH₂). On the addition of a masterbatch based on silane II or silane III, tubes can be produced, which have good mould stability and do not contract on warming above the normal polyamide melt point.

In tests 131 to 144, dried polymerisate 5, 9 or 10 was carefully introduced, the extruder funnel being closed, while the apparatus was flushed with nitrogen. On account of the careful exclusion of moisture, tubes having beautiful smooth surfaces were obtained.

The result of the mould stability tests at 230° C. clarify well the different chain structures of the polyamides. —NH₂ and, in particular, chains having —NH— groups, provide points for forced cross-linking between the polymer chains. Polymer chains advantageously having only one reactive H at the chain end (—NHR) generally provide silane linking reaction giving linear chain lengthening so that, primarily, the melt viscosity increases. Length contraction does not occur because the completely dry granulate has been processed and there is thus no partial reaction in the extruder.

Tests 121, 131, 135 and 140 were comparative. The exterior cross-section of the tubes in tests 131 to 144 was 6.3 mm, and their wall thickness 1 mm in each case.

TABLE 5

| Test | Polym. | MB | MB (%) | Mould Stability | Notch Toughness (kJ/m²) |
|---|---|---|---|---|---|
| 39 | 1 | — | — | — | 2.0 |
| 40 | 1 | 5 | 12 | +— | 20.0 |
| 41 | 1 | 3 | 12 | +— | 8.0 |
| 42 | 1 | 30 | 1.33 | +— | 5.3 |
| 43 | 3 | 5 | 12 | +—— | 7.9 |
| 44 | 4 | 5 | 12 | +— | 12.6 |

TABLE 6

| Test | Polym. | MB | MB (%) | Mould Stability | Notch Toughness (kJ/m²) |
|---|---|---|---|---|---|
| 45 | 6 | — | — | — | 5 |
| 46 | 6 | 3 | 4 | +— | 10 |
| 47 | 6 | 3 | 6 | +— | 36 |
| 48 | 6 | 3 | 8 | +— | 16 |
| 49 | 6 | 3 | 10 | +— | 12 |
| 50 | 6 | 5 | 6 | +— | (*) |
| 51 | 6 | 5 | 10 | +— | 15 |
| 52 | 6 | 30 | 1.13 | +— | 24 |
| 53 | 7 | — | — | — | 6 |
| 54 | 7 | 3 | 10 | +— | 21 |
| 55 | 7 | 5 | 10 | +— | 22 |
| 56 | 5 | 3 | 10 | +— | 54 |
| 57 | 5 | 5 | 10 | +— | (*) |

TABLE 7

| Test | Polym. | MB | MB (%) | Mould Stability | Notch Toughness (kJ/m²) |
|---|---|---|---|---|---|
| 58 | 1 | — | — | — | 3 |
| 59 | 1 | 10 | 5 | — | 12 |
| 60 | 1 | 10 | 8 | +— | 22 |
| 61 | 1 | 10 | 10 | + | 50 |
| 62 | 1 | 11 | 5 | — | 19 |
| 63 | 1 | 11 | 8 | +— | 31 |
| 64 | 1 | 11 | 10 | + | 31 |
| 65 | 1 | (**) | 8 | — | 8 |

TABLE 8

| Test | Polym. | MB | MB (%) | Mould Stability | Notch Toughness (kJ/m²) |
|---|---|---|---|---|---|
| 66 | 5 | 10 | 7 | + | ub |
| 67 | 3 | 10 | 8 | — | 6 |
| 68 | 6 | 10 | 7 | +— | 40 |
| 69 | 7 | 10 | 7 | +— | ub |
| 70 | 8 | 10 | 7 | +— | 62 |
| 71 | 7 | 11 | 7 | +— | 35 |
| 72 | 8 | 9 | 7 | +— | 55 |
| 73 | 8 | 9 | 8 | +— | 60 |
| 74 | 8 | 9 | 9 | +— | 55 |
| 75 | 8 | 9 | 10 | +— | 53 |
| 76 | 1 + 8 | 9 | 9 | +— | 57 |
| 77 | 5 + 8 | 9 | 9 | +— | ub |

TABLE 9

| Test | Polym. | MB | MB (%) | Mould Stability | Notch Toughness (kJ/m²) | Silane Addn. (% w/w) |
|---|---|---|---|---|---|---|
| 78 | 1 | — | — | — | 2 | |
| 79 | 1 | 30 | 1.3 | +—— | 5.8 | 0.975 |
| 80 | 1 | 19 | 2.0 | +— | 5.9 | 1.00 |
| 81 | 1 | 13 | 5.0 | +— | 13 | 1.00 |
| 82 | 1 | 20 | 2.0 | +—— | 4.5 | 1.00 |
| 83 | 1 | 21 | 2.0 | +— | 6.0 | 1.00 |
| 84 | 1 | 30 | 2.0 | + | 7.1 | 1.50 |
| 85 | 1 | 19 | 3.0 | + | 8.3 | 1.50 |
| 86 | 1 | 20 | 3.0 | + | 7.1 | 1.50 |
| 87 | 1 | 21 | 3.0 | + | 6.7 | 1.50 |

TABLE 10

| Test | Polym. | MB | MB (%) | Mould Stability | Notch Toughness (kJ/m²) |
|---|---|---|---|---|---|
| 88 | 9 | — | — | — | 5.5 |
| 89 | 9 | (**) | 2 | — | 7.7 |
| 90 | 9 | 19 | 1 | +— | 15 |
| 91 | 9 | 19 | 1.6 | +— | 39 |
| 92 | 9 | 19 | 2 | + | 43 |
| 93 | 9 | 22 | 2 | +— | 32 |
| 94 | 10 | — | — | + | 5.5 |
| 95 | 10 | 19 | 2.4 | + | 12.4 |

TABLE 10-continued

| Test | Polym. | MB | MB (%) | Mould Stability | Notch Toughness (kJ/m²) |
|---|---|---|---|---|---|
| 96 | 10 | 22 | 2.4 | + | 9.2 |

TABLE 11

| Test | Polym. | MB | MB (%) | Mould Stability | Notch Toughness (kJ/m²) |
|---|---|---|---|---|---|
| 97 | 14 | — | — | — | 3.6 |
| 98 | 14 | 19 | 1.2 | — | 5.0 |
| 99 | 14 | 19 | 1.6 | — | 5.9 |
| 100 | 14 | 19 | 2.0 | +— | 6.1 |
| 101 | 14 | — | — | — | 3.0 |
| 102 | 14 | 36 | 1.0 | — | 3.1 |
| 103 | 14 | 36 | 2.0 | +— | 4.1 |
| 104 | 14 | 36 | 3.0 | +— | 4.4 |
| 105 | 13 | — | — | — | 6.8 |
| 106 | 13 | 19 | 1.2 | +—— | 7.7 |
| 107 | 13 | 19 | 1.6 | +— | 8.6 |
| 108 | 13 | 19 | 2.0 | ++— | 10.6 |

TABLE 11-continued

| Test | Polym. | MB | MB (%) | Mould Stability | Notch Toughness (kJ/m²) |
|---|---|---|---|---|---|
| 109 | 15 | — | — | — | 2.9 |
| 110 | 15 | 19 | 1.2 | +— | 4.0 |
| 111 | 15 | 19 | 1.6 | +— | 3.5 |

TABLE 12

| Test | Polym. | MB | MB (%) | PEX (%) | Mould Stability | Notch Toughness (kJ/m²) | |
|---|---|---|---|---|---|---|---|
| 112 | 5 | — | — | — | — | 5.9 | 17.5 |
| 113 | 5 | — | — | 10 | — | 8.8 | 20.5 |
| 114 | 5 | 21 | 1.8 | 10 | +— | 13.4 | 36.6 |
| 115 | 5 | 21 | 1.6 | 20 | | | |
| 116 | 1 | — | — | — | — | 2.1 | 3.4 |
| 117 | 1 | — | — | 10 | — | 1.7 | 2.7 |
| 118 | 1 | 21 | 1.8 | 10 | + | 5.1 | 11.7 |
| 119 | 1 | 21 | 1.6 | 20 | + | 5.5 | 8.5 |
| 120 | 1 | 21 | 2.7 | 10 | + | 7.0 | 16.9 |

TABLE 13

| Test | Polym. | MB | MB (%) | Turns (rpm) | Inset Temp. (C.) | Outlet Temp. (C.) | Take-off (m/min) | Mould Stability |
|---|---|---|---|---|---|---|---|---|
| 121 | 5 | — | — | 40 | 190 | 210 | 2.3 | — |
| 122 | 5 | 30 | 1.3 | 40 | 190 | 210 | 2.3 | + |
| 123 | 5 | 19 | 2.0 | 40 | 190 | 210 | 2.3 | + |
| 124 | 5 | 12 + 13 | 3.3 | 60 | 200 | 215 | 2.3 | + |
| 125 | 8 | 30 | 1.3 | 60 | 190 | 210 | 2.3 | + |
| 126 | 8 | 19 | 2.0 | 40 | 200 | 215 | 2.3 | + |
| 127 | 8 | 20 | 2.0 | 40 | 200 | 215 | 2.3 | + |
| 128 | 8 | 21 | 2.0 | 40 | 200 | 225 | 2.3 | + |
| 129 | 5* | 19 | 2.0 | 40 | 190 | 210 | 4.0 | + |
| 130 | 5* | 22 | 2.0 | 40 | 190 | 210 | 4.0 | + |
| 131 | 5 | — | — | 40 | 175 | 180 | 3.7 | — |
| 132 | 5 | 21 | 1.0 | 40 | 180 | 190 | 3.6 | + |
| 133 | 5 | 21 | 2.0 | 40 | 180 | 190 | 3.5 | + |
| 134 | 5 | 21 | 2.7 | 40 | 180 | 190 | 3.5 | + |
| 135 | 9 | — | — | 40 | 200 | 210 | 4.0 | — |
| 136 | 9 | 21 | 1.00 | 40 | 200 | 210 | 3.7 | + |
| 137 | 9 | 21 | 2.00 | 40 | 200 | 210 | 3.7 | + |
| 138 | 9 | 21 | 3.54 | 40 | 200 | 210 | 3.7 | + |
| 139 | 9 | 21 | 4.72 | 40 | 200 | 210 | 3.7 | + |
| 140 | 10 | — | — | 40 | 170 | 170 | 3.9 | — |
| 141 | 10 | 21 | 1.00 | 40 | 170 | 170 | 3.0 | — |
| 142 | 10 | 21 | 2.00 | 40 | 170 | 170 | 3.2 | +— |
| 143 | 10 | 21 | 2.24 | 40 | 170 | 170 | 3.2 | + |
| 144 | 10 | 21 | 3.00 | 40 | 170 | 170 | 3.1 | + |

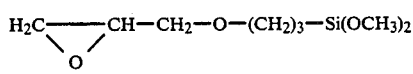  II

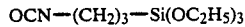  III

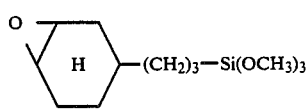  IV

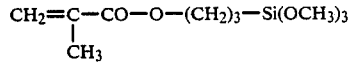  V

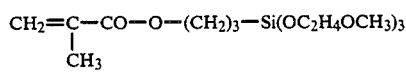  VI

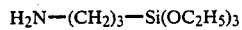  VII

-continued

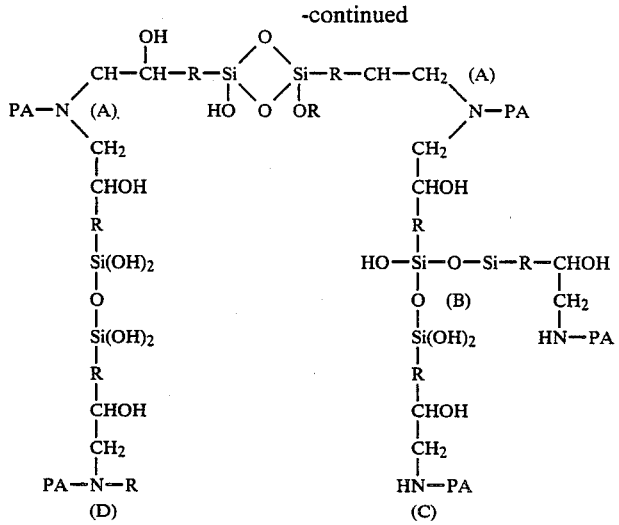
VIII

What is claimed is:

1. In a process for the preparation of molded bodies of thermoplastic polyamides comprising intensively mixing a polyamide with a masterbatch containing at least 5% by weight of a silane of the formula

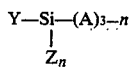

wherein n is 0, 1 or 2; A is a hydrolyzable radical, the As being the same or different or two A's forming a divalent radical when n is 0 or 1, Z is an inert organic radical, the Zs being the same or different when n is 2 and Y is an organic radical having a functional group capable of reacting with an amino and/or carboxyl and/or amide groups in the polyamide chain to form a bond, converting the mixture by thermoplastic processing to molded bodies and conditioning the bodies before use by exposure to naturally ambiant moisture or briefly water, the improvement comprising adding the silane to the polyamide in the form of a materbatch selected from the group consisting of (1) a granulate of a melt of a polyolefin and the silane, (2) a silane swellable material containing the silane, and (3) a non-swellable thermoplast sponge with open pores filled with the silane.

2. A molding material consisting essentially of a homogeneous mixture of a starting polyamide and a masterbatch, containing at least 5% by weight of a silane in said masterbatch being selected from the group consisting of (1) a granulate of a melt of a polyolefin and the silane, (2) a silane swellable material containing the silane, and (3) a non-swellable thermoplast sponge with open pores filled with the silane.

3. The process of claim 1 wherein the masterbatch is a granulate of a melt of a polyolefin and the silane.

4. The process of claim 1 wherein the masterbatch is a non-swellable thermoplast sponge with open pores filled with the silane and the thermoplast is a polyamide.

5. The process of claim 4 wherein the polyamide is selected from the group consisting of polyamide 11, polyamide 6 and polyamide 12.

6. The process of claim 1 wherein the masterbatch is a granulate of a melt of a copolyolefin and the silane.

7. The process of claim 1 wherein the masterbatch is silane swellable thermoplastic material containing the silane.

8. The process of claim 7 in which the material is a polybutadiene containing block polymer.

9. The process according to claim 7 wherein the material is a styrene/butadiene block containing polymer.

10. The process according to claim 7 wherein the material is a styrene/butadiene triblock polymer.

11. The process according to claim 6 wherein the copolyolefin is selected from the group consisting of ethylene-propylene, ethylene-butene, ethylene-hexene, ethylene-octene, ethylene-butyl acrylate, ethylene-ethyl acrylate, ethylene-vinyl acetate, ethylene-propylene-diene monomer, and blends of said copolyolefins.

12. The process of claim 1 wherein the masterbatch is grains of a melt of a polyolefin and the silane in particle form having a diameter of less than 1 mm.

13. The process of claim 1 wherein the masterbatch is at least one member selected from the group consisting of cross-linked butadiene, acrylic acid ester, methacrylic acid ester, styrene and acrylonitrile polymers.

14. The process of claim 1 wherein the masterbatch is at least one member selected from the group consisting of grafted methyl acrylate, methyl methacrylate, styrene and acrylonitrile polymers.

15. The process of claim 1 wherein the masterbatch is a polymer selected from the group consisting of methacrylate-acrylonitrile-styrene, methacrylate-acrylonitrile-butadiene-styrene-acrylonitrile-butadiene-styrene, acrylate and mixtures thereof.

16. The process of claim 1 wherein the mixture of polyamide and masterbatch contains 0.1 to 5% by weight of the silane based on the weight of the polyamide.

* * * * *